US011980238B2

(12) United States Patent
Harris et al.

(10) Patent No.: US 11,980,238 B2
(45) Date of Patent: *May 14, 2024

(54) PARTICULATE RESISTANT GARMENT

(71) Applicants: LION GROUP, INC., Dayton, OH (US); NORTH CAROLINA STATE UNIVERSITY, Raleigh, NC (US)

(72) Inventors: Richard H. Harris, Beavercreek, OH (US); Alysha Lynn Gray, Beavercreek, OH (US); Kathryn Ann York, Tipp City, OH (US); Cassandra H. Kwon, Raleigh, NC (US); Marc Christopher Mathews, Raleigh, NC (US); Chandler Ross Maness, Portland, OR (US); Robert Bryan Ormond, Holly Springs, NC (US)

(73) Assignees: LION GROUP, INC., Dayton, OH (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,476

(22) Filed: Apr. 7, 2021

(65) Prior Publication Data

US 2021/0298372 A1 Sep. 30, 2021

Related U.S. Application Data

(63) Continuation of application No. 16/127,914, filed on Sep. 11, 2018, now Pat. No. 11,006,680.

(Continued)

(51) Int. Cl.

*A41D 13/02* (2006.01)
*A41D 13/00* (2006.01)

(Continued)

(52) U.S. Cl.

CPC ......... *A41D 13/02* (2013.01); *A41D 13/0005* (2013.01); *A41D 15/00* (2013.01);

(Continued)

(58) Field of Classification Search

CPC ......... A41D 13/02; A41D 31/08; A41D 31/10

(Continued)

(56) References Cited

U.S. PATENT DOCUMENTS

| | | |
|---|---|---|
| 5,614,302 A | 3/1997 | Nance, Jr. |
| 5,754,982 A | 5/1998 | Gariner |

(Continued)

FOREIGN PATENT DOCUMENTS

| | | |
|---|---|---|
| EP | 2271228 | 3/2013 |
| RU | 5857 U1 | 1/1998 |

(Continued)

OTHER PUBLICATIONS

GB Examination Report dated Sep. 23, 2022 which pertains to Patent Application No. GB2004829.4, 2 pages.

(Continued)

*Primary Examiner* — Timothy K Trieu

(74) *Attorney, Agent, or Firm* — Thompson Hine LLP

(57) ABSTRACT

A protective garment system including a bib configured to fit around at least part of an upper portion of a torso of a wearer. The bib includes an outer material and a particulate-blocking material which is configured to be positioned between the outer material and a wearer when the bib is worn. The bib has a perimeter and is configured to be releasably attached to a pair of trousers about the perimeter.

24 Claims, 16 Drawing Sheets

Related U.S. Application Data

(60) Provisional application No. 62/575,823, filed on Oct. 23, 2017, provisional application No. 62/567,456, filed on Oct. 3, 2017.

(51) Int. Cl.

| | |
|---|---|
| ***A41D 15/00*** | (2006.01) |
| ***A41D 27/12*** | (2006.01) |
| ***A41D 31/08*** | (2019.01) |
| ***A41D 31/10*** | (2019.01) |
| ***A44B 19/32*** | (2006.01) |
| ***A62B 17/00*** | (2006.01) |
| *A41D 27/24* | (2006.01) |

(52) U.S. Cl.

CPC ........... *A41D 27/12* (2013.01); *A41D 31/085* (2019.02); *A41D 31/10* (2019.02); *A44B 19/32* (2013.01); *A62B 17/001* (2013.01); *A62B 17/003* (2013.01); *A62B 17/006* (2013.01); *A41D 27/24* (2013.01); *A41D 2300/30* (2013.01); *A41D 2300/32* (2013.01); *A41D 2300/322* (2013.01); *A41D 2500/20* (2013.01); *A41D 2600/20* (2013.01)

(58) Field of Classification Search

USPC ................................................................ 2/79

See application file for complete search history.

(56) References Cited

U.S. PATENT DOCUMENTS

| | | | | |
|---|---|---|---|---|
| 5,810,166 | A | 9/1998 | Weinreb | |
| 6,014,795 | A | 1/2000 | McMahon et al. | |
| 6,038,700 | A | 3/2000 | Aldridge et al. | |
| 6,088,831 | A | 7/2000 | Jensen et al. | |
| 7,168,103 | B2 | 1/2007 | Aldridge et al. | |
| 7,284,398 | B2 * | 10/2007 | Hubner | D04B 1/14<br>66/202 |
| 7,337,506 | B2 | 3/2008 | Kusayama et al. | |
| 7,500,291 | B2 | 3/2009 | Matsumoto | |
| 7,591,051 | B2 | 9/2009 | Kusayama et al. | |
| 7,996,920 | B2 | 8/2011 | Aldridge | |
| 8,347,420 | B2 * | 1/2013 | Kruszewski | B32B 5/022<br>2/458 |
| 8,522,368 | B2 | 9/2013 | McIntosh et al. | |
| 9,409,044 | B2 | 8/2016 | Murray et al. | |
| 2001/0008027 | A1 | 7/2001 | Duplock | |
| 2003/0014802 | A1 | 1/2003 | Benham | |
| 2004/0107473 | A1 * | 6/2004 | Jones | A41D 31/04<br>2/69 |
| 2005/0143796 | A1 | 6/2005 | Augustine et al. | |
| 2007/0094763 | A1 | 5/2007 | Silver | |
| 2007/0169247 | A1 | 7/2007 | Mordecai et al. | |
| 2009/0019615 | A1 * | 1/2009 | Young | A41B 13/10<br>2/49.1 |
| 2009/0255029 | A1 * | 10/2009 | Aldridge | A41D 3/02<br>2/81 |
| 2009/0255031 | A1 | 10/2009 | McIntosh et al. | |
| 2012/0174296 | A1 | 7/2012 | Martin | |
| 2012/0192335 | A1 | 8/2012 | Crye | |
| 2012/0233748 | A1 | 9/2012 | Curtis | |
| 2013/0031703 | A1 | 2/2013 | Curtis | |
| 2013/0133129 | A1 | 5/2013 | Martin | |
| 2015/0040300 | A1 * | 2/2015 | Murray | A62B 17/003<br>2/455 |
| 2017/0199011 | A1 | 7/2017 | Beck | |
| 2017/0227331 | A1 | 8/2017 | Hexels | |

FOREIGN PATENT DOCUMENTS

| | | | |
|---|---|---|---|
| RU | 2104463 | C1 | 2/1998 |
| RU | 8875 | U1 | 1/1999 |
| RU | 2155313 | C1 | 8/2000 |
| RU | 130061 | U1 | 7/2013 |
| RU | 142589 | U1 | 6/2014 |
| RU | 171890 | U1 | 6/2017 |
| RU | 2361973 | C1 | 6/2017 |

OTHER PUBLICATIONS

Product featuring "Innotex Gray™", by Innotex, http://innotexprotection.com/en/equipment/gray/ (as late as Jun. 13, 2017).

Product featuring "Nomex® Nano" by DuPont™, Next Generation of Firefighter Protection, www.dupont.com/dpt/nomex-knowledge-center/industries/emergency-response/next-generation-firefighter-protection.html (as late as Apr. 2016).

Product featuring "Nomex® Nano Flex" by DuPont™, Game Changing Barrier Protection, http://www.dupont.com/content/dam/dupont/products-and-services/personal-protective-equipment/thermal-protective-apparel-and-accessories/documents/DPT_Nomex_Nano%20Flex_Sell_Sheet.pdf (as late as Apr. 2016).

Product featuring "Stedair Prevent, Particulate Blocking Hood Technology", by Stedfast Advanced Barrier Technologies (as late as Sep. 2017).

Product information featuring "Stedair Prevent, Particle Barrier Protection for Firefighter Hoods", by Stedfast Advanced Barrier Technologies (as late as Sep. 2017.

Product featuring "Innotex Gray™, Engineered for your Health", by Innotex, http://innotexprotection.com/wp-content/uploads/2017/04/INNOTEX-Flyer-GRAY-03-WEB.pdf (as late as Jun. 13, 2017).

"Increase Exposure Protection at the Site of Structural Firefighter PPE Interfaces Statement of Objectives" by Department of Homeland Security Science and Technology Directorate, Washington, DC (Nov. 21, 2014).

PCT, International Search Report and Written Opinion, International Application No. PCT/US2018/050416 (dated Dec. 27, 2018).

U.S., Restriction Requirement. U.S. Patent and Trademark Office; U.S. Appl. No. 16/127,914, 6 pages, filed Mar. 23, 2020.

U.S., Non-Final Office Action. U.S. Patent and Trademark Office; U.S. Appl. No. 16/127,914, 14 pages, filed Jul. 31, 2020.

U.S., Notice of Allowance. U.S. Patent and Trademark Office; U.S. Appl. No. 16/127,914, 11 pages, filed Jan. 4, 2021.

Intellectual Property Office, Examination Report, Application No. GB2004829.4, 2 pages, dated Feb. 4, 2022.

(GB) Intellectual Property Office, Examination Report, Application No. GB2004829.4, 5 pages, dated May 20, 2022.

United Kingdom Intellectual Property Office, Examination Report under Section 18(3), United Kingdom Application No. GB2004829.4, 4 pages, dated Mar. 20, 2023.

* cited by examiner

PARTICULATE RESISTANT GARMENT

This application is a continuation of U.S. patent application Ser. No. 16/127,914, filed on Sep. 11, 2018, which claims priority to U.S. Provisional Patent Application Ser. No. 62/567,456, filed on Oct. 3, 2017, and U.S. Provisional Patent Application Ser. No. 62/575,823, filed on Oct. 23, 2017. The entire contents of all three of those applications are hereby incorporated by reference.

This invention was made with government support under grant number 2015-ST-108-FRG001 awarded by the U.S. Department of Homeland Security (DHS). The government has certain rights in the invention.

This application relates to protective garments, and more particularly, to protective garments for blocking ingress of particulates and methods for making such garments.

BACKGROUND

Protective or hazardous duty garments are used in a variety of industries and settings to protect the wearer from hazardous conditions such as heat, smoke, cold, sharp objects, chemicals, liquids, fumes and the like. The protective garments may also be desired to reduce the ingress of particulates from the external environment to an inner compartment of the garment.

SUMMARY

In one embodiment the invention is a protective garment system including a bib configured to fit around at least part of an upper portion of a torso of a wearer. The bib includes an outer material and a particulate-blocking material which is configured to be positioned between the outer material and a wearer when the bib is worn. The bib has a perimeter and is configured to be releasably attached to a pair of trousers about the perimeter.

DETAILED DESCRIPTION

Figure 1:
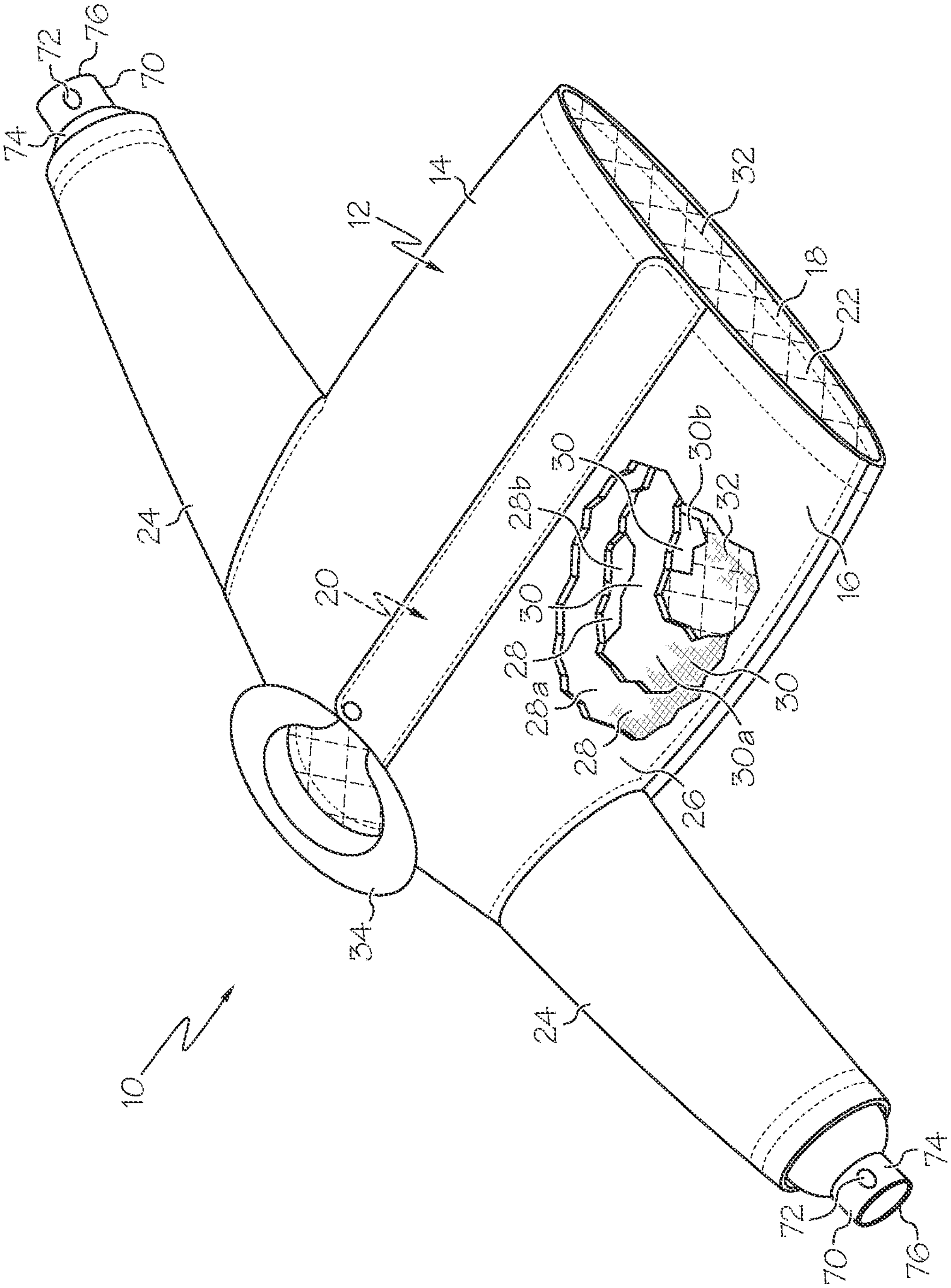
FIG. 1 is front perspective view of a coat, with portions of various layers cut away for illustrative purposes.

FIG. 1 illustrates a protective or hazardous duty garment in the form of a firefighter's coat, generally designated 10. The coat 10 may include a body portion 12 having a left front panel 14, right front panel 16 and a back panel 18. The left front panel 14 and right front panel 16 may be releasably attachable by a fastener 20, such as a zipper, snaps, clasps, clips, hook-and-loop fastening material (i.e., VELCRO® fastening material), combinations of these components or the like. The body portion 12 may define a torso cavity 22 that is shaped and configured to receive a wearer's torso therein. The coat 10 may include a pair of sleeves 24 coupled to and extending generally outwardly from the body portion 12 and shaped to receive a wearer's arms therein.

The coat 10 may include various layers through its thickness to provide various heat, moisture and/or abrasion resistant qualities to the coat 10 so that the coat 10 can be used as a protective, hazardous duty, and/or firefighter garment. For example, the coat 10 may include an outer shell, outer layer or outer material 26, a moisture barrier 28 located inside of and adjacent to the outer shell 26 (e.g. positioned between the outer shell 26 and the torso cavity 22), a thermal liner or barrier 30 located inside of and adjacent to the moisture barrier 28, and an inner liner or face cloth 32 located inside of and adjacent to the thermal barrier 30.

The outer shell 26 may be made of or include a variety of materials, including a flame, heat and abrasion resistant material such as a compact weave of aramid fibers and/or polybenzamidazole fibers. Commercially available aramid materials include NOMEX and KEVLAR fibers (both trademarks of E.I. DuPont de Nemours & Co., Inc. of Wilmington, Del.), and commercially available polybenzamidazole fibers include PBI fibers (a trademark of PBI Performance Fabrics of Charlotte, N.C.). Thus, the outer shell 26 may be an aramid material, a blend of aramid materials, a polybenzamidazole material, a blend of polybenzamidazole fibers, a blend of aramid and polybenzamidazole materials, a polyphenylene benzobisoxazole (PBO) material, a thermostable organic polymer material, such as KERMEL® material sold by Kermel SAS of Colmar, France, a blend of any of the materials listed above, or other appropriate materials.

If desired, the outer shell 26 may be coated with a polymer, such as a durable, water repellent finish or coating (i.e. a perfluorohydrocarbon finish, such as TEFLON® finish sold by E. I. Du Pont de Nemours and Company of Wilmington, Del., or a fluorine free water repellent finish). The materials of the outer shell 26 may have a weight of, for example, between about five and about ten oz./yd$^2$. Moreover, if desired the outer shell 26 may have a self-decontaminating finish or coating applied thereto.

The moisture barrier 28 and thermal barrier 30 may be generally coextensive with the outer shell 26, or spaced slightly inwardly from the outer edges of the outer shell 26 (i.e., spaced slightly inwardly from the outer ends of the sleeves 24, the collar 34 and/or from the lower edge or hem of the coat 10) to provide moisture and thermal protection throughout the coat 10. The moisture barrier 28 may include a semi-permeable membrane layer **28*a* and a substrate 28*b***.

The membrane layer **28*a* may be generally water vapor permeable but generally impermeable to liquid moisture. The membrane layer 28*a* may be made of or include expanded polytetrafluoroethylene ("PTFE") such as GORE-TEX or CROSSTECH materials (both of which are trademarks of W.L. Gore & Associates, Inc. of Newark, Del.), polyurethane-based materials, neoprene-based materials, cross-linked polymers, polyamid, or other materials. The membrane layer 28***a* may have microscopic openings that permit moisture vapor (such as water vapor) to pass therethrough, but block liquids (such as liquid water) from passing therethrough. The membrane layer 28*a* may be made of a microporous material that is either hydrophilic, hydrophobic, or somewhere in between. The membrane layer 28*a* may also be monolithic and may allow moisture vapor transmission therethrough by molecular diffusion. The membrane layer 28*a* may also be a combination of microporous and monolithic materials (known as a bicomponent moisture barrier), in which the microporous or monolithic materials are layered or intertwined.

The membrane layer 28*a* may be bonded, adhered or otherwise coupled to a substrate 28*b* of a flame and heat resistant material to provide structure and protection to the membrane layer 28*a*. Thus, either the membrane layer 28*a* alone, or the membrane layer 28*a* in combination with the moisture barrier substrate 28*b*, may be considered to constitute the moisture barrier 28. The substrate 28*b* may be or include aramid fibers similar to the aramid fibers of the outer shell 26, but may be thinner and lighter in weight. The substrate 28*b* may be woven, non-woven, spunlace or other materials. In the illustrated embodiment, the membrane layer 28*a* is located between the outer shell 26 and the substrate 28*b*. However, the orientation of the moisture barrier 28 may be reversed such that the substrate 28*b* is located between the outer shell 26 and the membrane layer 28*a*.

The thermal barrier 30 may be made of nearly any suitable flame resistant material that provides sufficient thermal insulation. In one embodiment, the thermal barrier 30 may include a layer of bulk material 30*a* in the form of relatively thick (i.e. between about 1/16"-3/16") batting, felt or needled non-woven bulk or batting material. The bulk material 30*a* can include aramid fiber batting (such as NOMEX batting), aramid needlepunch material, an aramid non-woven material, an aramid blend needlepunch material, an aramid blend batting material, an aramid blend non-woven material, foam (either open cell or closed cell), or other suitably thermally insulating materials. The bulk material 30*a* may trap air and possess sufficient loft to provide thermal resistance to the coat 10.

The bulk material 30*a* may be quilted or otherwise coupled to a thermal barrier face cloth 30*b* which can be a weave of a lightweight aramid material. Thus, either the bulk material 30*a* alone, or the bulk material 30*a* in combination with the thermal barrier face cloth 30*b*, may be considered to constitute the thermal barrier 30. In the illustrated embodiment, the thermal barrier bulk material 30*a* is located between the outer shell 26 and the thermal barrier face cloth 30*b*. However, the orientation of the thermal barrier 30 may be reversed such that the thermal barrier face cloth 30*b* is located between the outer shell 26 and the bulk layer 30*a*. If desired, the thermal barrier 30 may be treated with a water-resistant or water-repellent finish. In one embodiment, the thermal barrier 30 (or the coat 10 as a whole) may have a thermal protection performance ("TPP") of at least about twenty, and the coat 10 as a whole may have a TPP of at least about thirty-five, although the TPP values can vary.

Although the moisture barrier 28 is shown as being located between the outer shell 26 and the thermal barrier 30, the positions of the moisture barrier 28 and thermal barrier 30 may be reversed such that the thermal barrier 30 is located between the outer shell 26 and the moisture barrier 28, or additional moisture barrier 28 and/or thermal barrier layers 30 can be utilized or various other orientations or configurations may be used.

The face cloth 32 may be the innermost layer of the coat 10, located inside the thermal barrier 30 and moisture barrier 28. The face cloth 32 can provide a comfortable surface for the wearer and protect the thermal barrier 30 and/or moisture barrier 28 from abrasion and wear. The face cloth 32 may be quilted to the adjacent layer (i.e. the thermal barrier 30 in the illustrated embodiment). However, the face cloth 32 is optional and may be excluded if desired. In addition, the coat 10 may not necessarily include the moisture barrier 28 and/or the thermal barrier 30 in certain cases.

Each layer of the coat 10 disclosed herein, including the layers and components described above, as well as those described below, and the coat 10 as a whole and other garments disclosed herein, may meet the National Fire Protection Association ("NFPA") 1971 standards for protective firefighting garments ("Protective Clothing for Structural Firefighting"), which standards as of the filing date of this application are entirely incorporated by reference herein. The NFPA standards specify various minimum requirements for heat and flame resistance and tear strength. For example, in order to meet the NFPA standards, the outer shell 26, moisture barrier 28, thermal barrier 30 and face cloth 32 must be able to resist igniting, burning, melting, dripping, separation, and/or shrinking more than 10% in any direction after being exposed to a temperature of 500° F. for at least five minutes. Furthermore, in order to meet the NFPA standards, the combined layers of the coat 10 must provide a thermal protective performance rating of at least thirty-five.

Alternately or in addition to the NFPA Standard 1971, the coat 10 and other garments disclosed herein may meet European Norm ("EN") standards for firefighting garments set by the European Committee for Standardization (also known as Comite Europeen de Normalisation ("CEN")). These standards include EN 469:2005 Level 1 and Level 2 certification. The EN standards for firefighter and protective garments in place as of the filing date of this application are entirely incorporated by reference herein.

Figure 2:
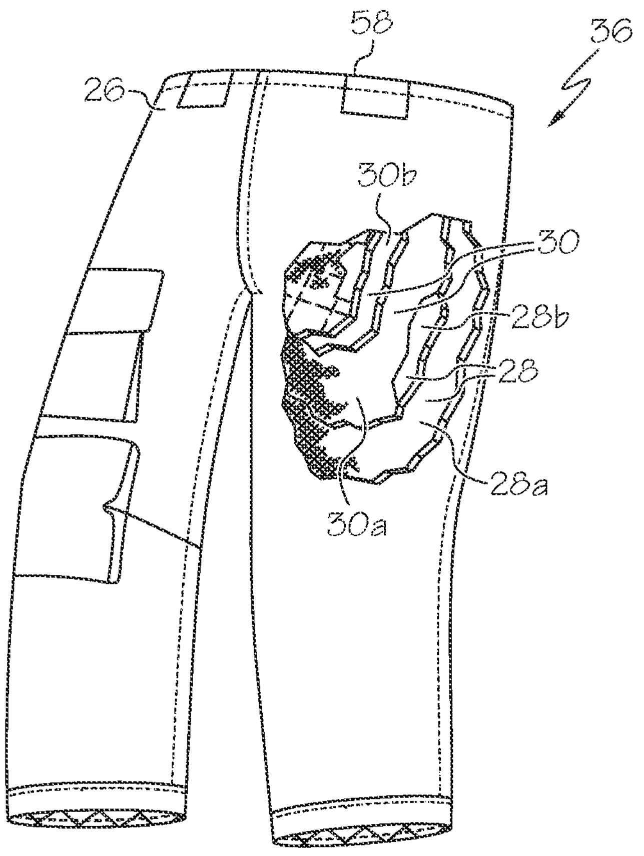
FIG. 2 is front perspective view of a pair of trousers, with portions of various layers cut away for illustrative purposes.
Figure 3:
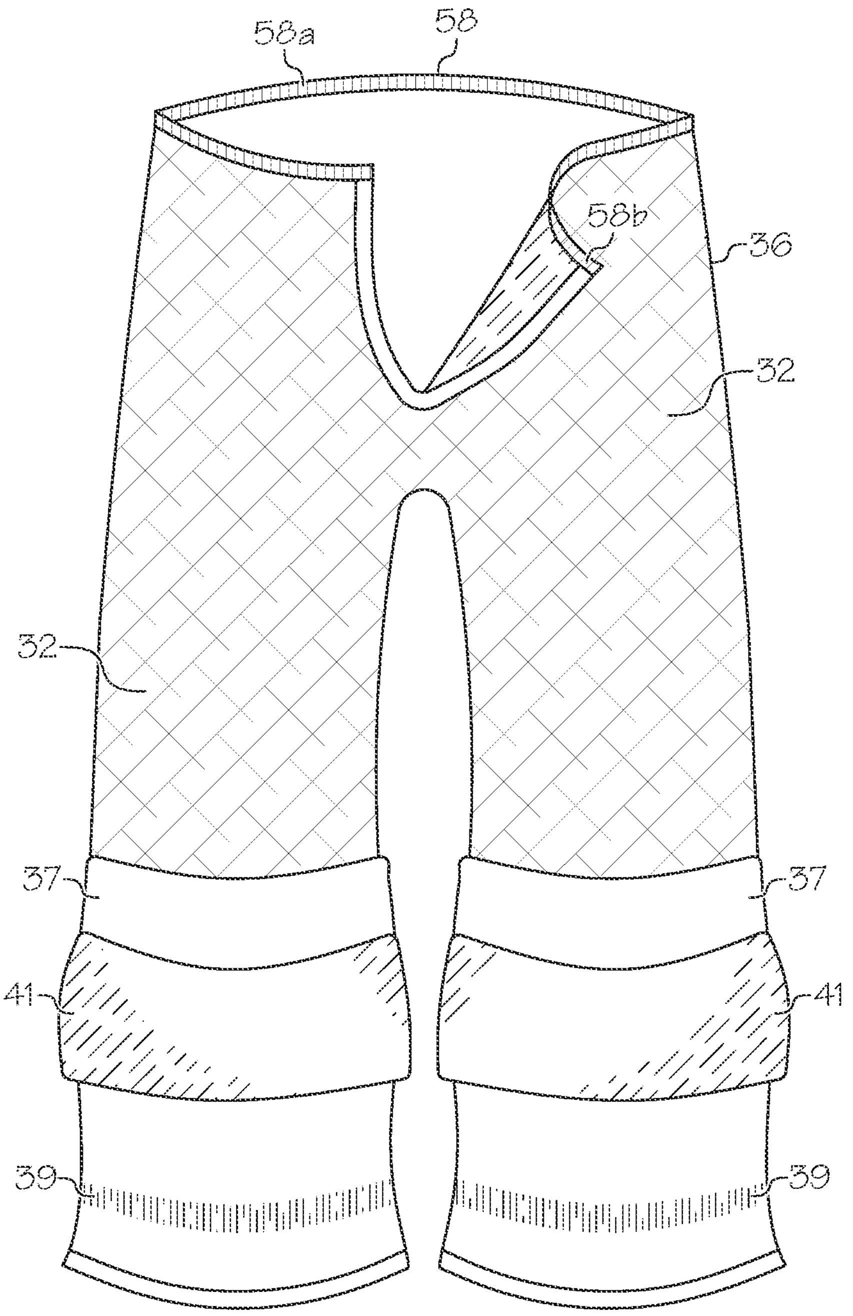
FIG. 3 is a front perspective view of the trousers of FIG. 3, turned inside-out.

FIG. 2 illustrates a pair of trousers 36 that may be able to be used in conjunction with or separately from the coat 10. The trousers 36 can be made of the same materials and layers, and in the various configurations with the same qualities as the coat 10 outlined above. FIG. 3 illustrates the trousers 36 inverted or turned inside-out such that the inner liner 32 is visible. The trousers 36 can include a water shedding lower portion 37 on each leg and an elastic band 39 near the bottom of each leg. Each leg of the trousers 36 can also include a calflet 41 that extends around the periphery of a wearer's calf or the upper portion of a wearer's boot, and is configured to engage a wearer's calf/boot in a manner similar to the way a wristlet 70 of the coat 10 (FIG. 1) engages a wearer's wrist or glove.

Figure 4:
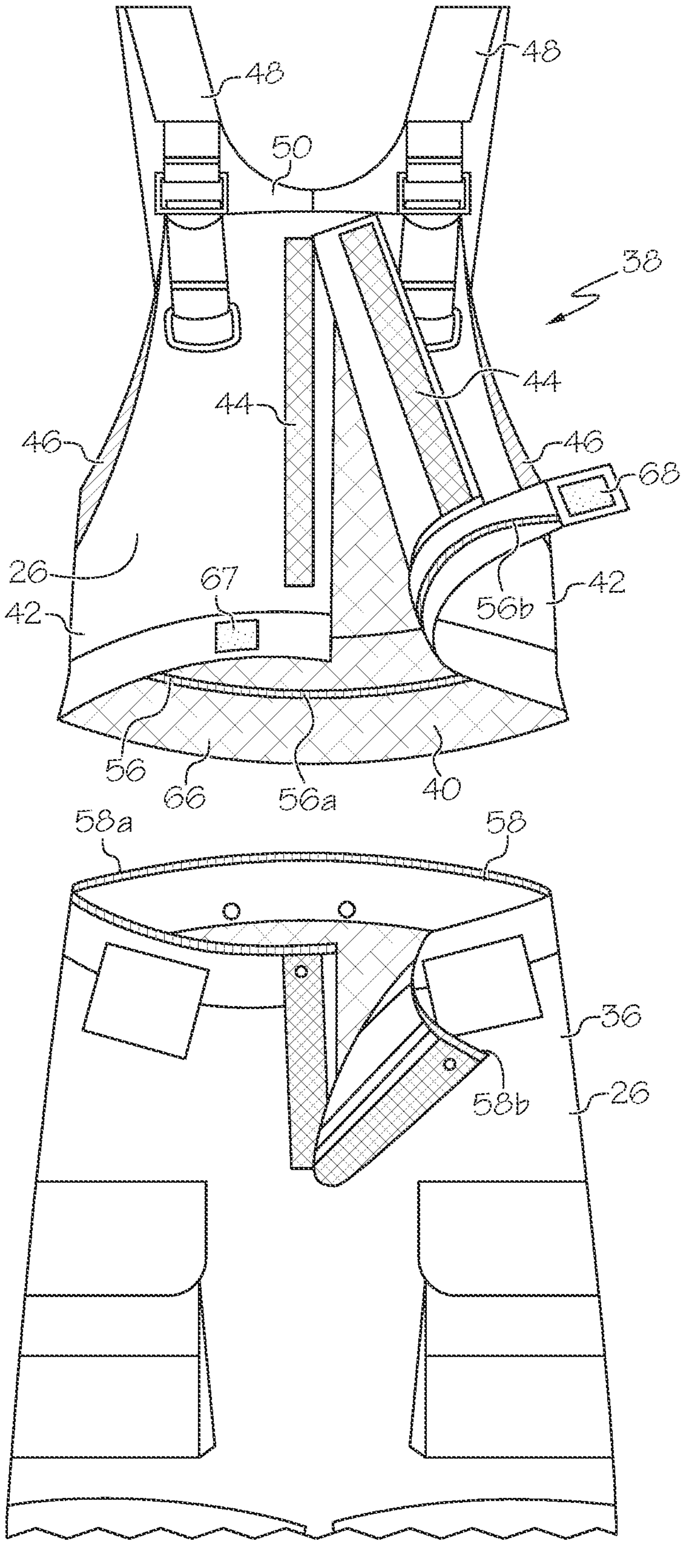
FIG. 4 is a front view of a bib and trousers, not coupled together and each partially unfastened.
Figure 5:
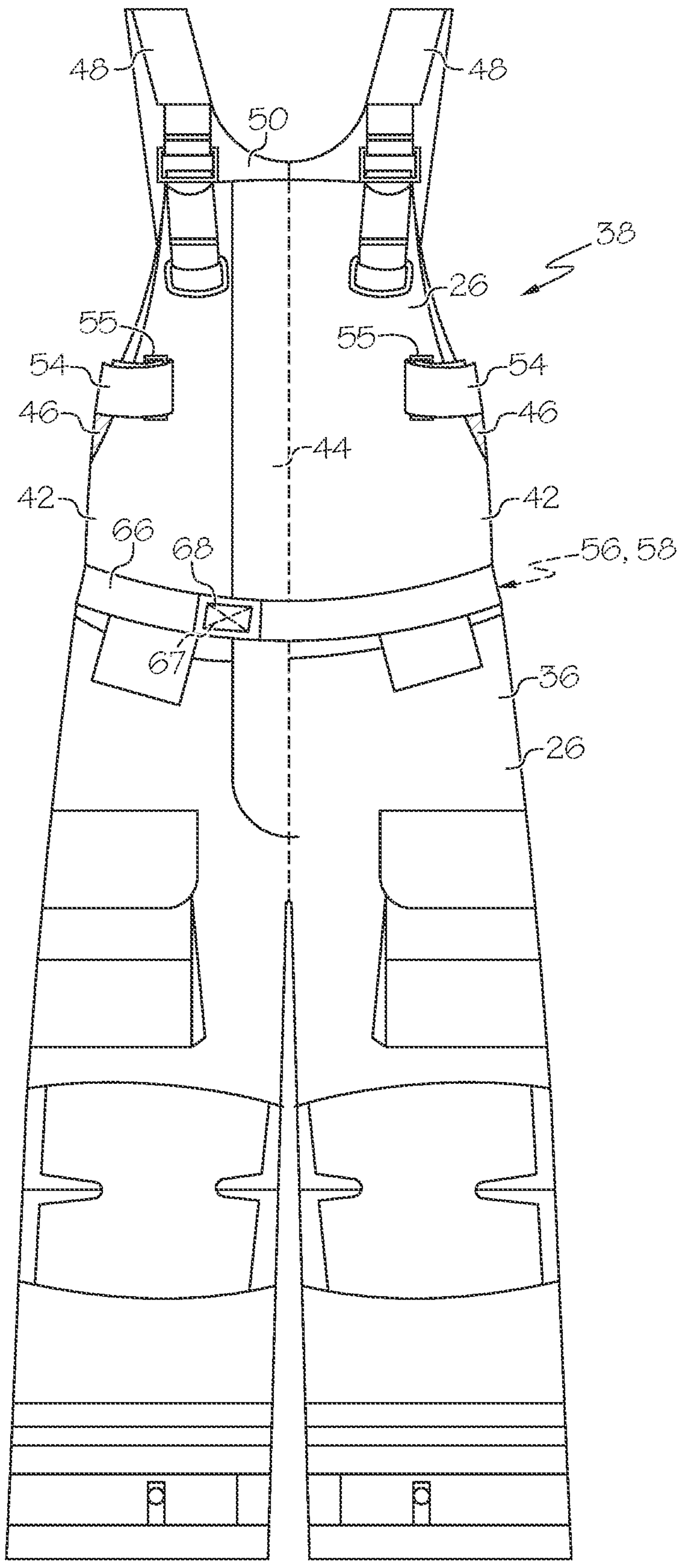
FIG. 5 is a front view of the bib and trousers of FIG. 4, coupled together and fastened.
Figure 6:
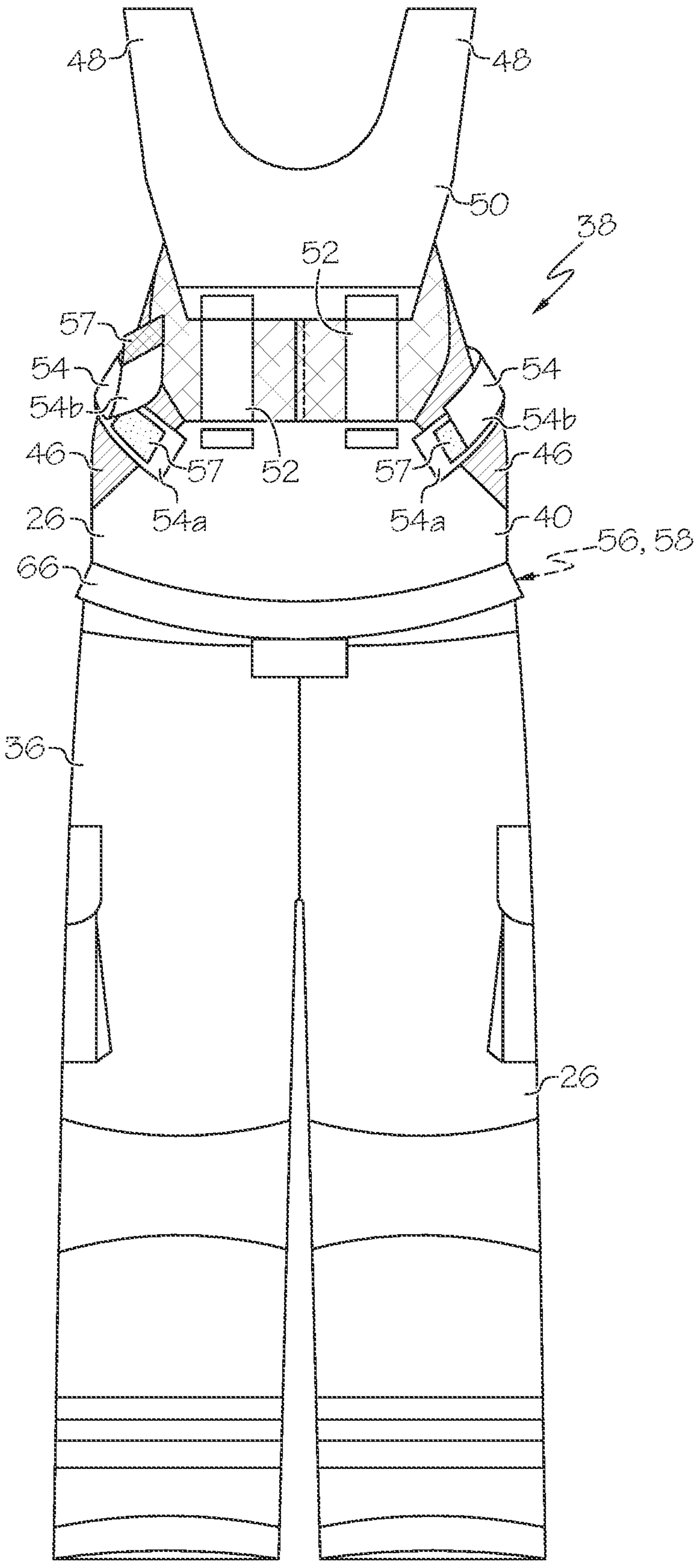
FIG. 6 is a back view of the bib and trousers of FIG. 5.
Figure 7:
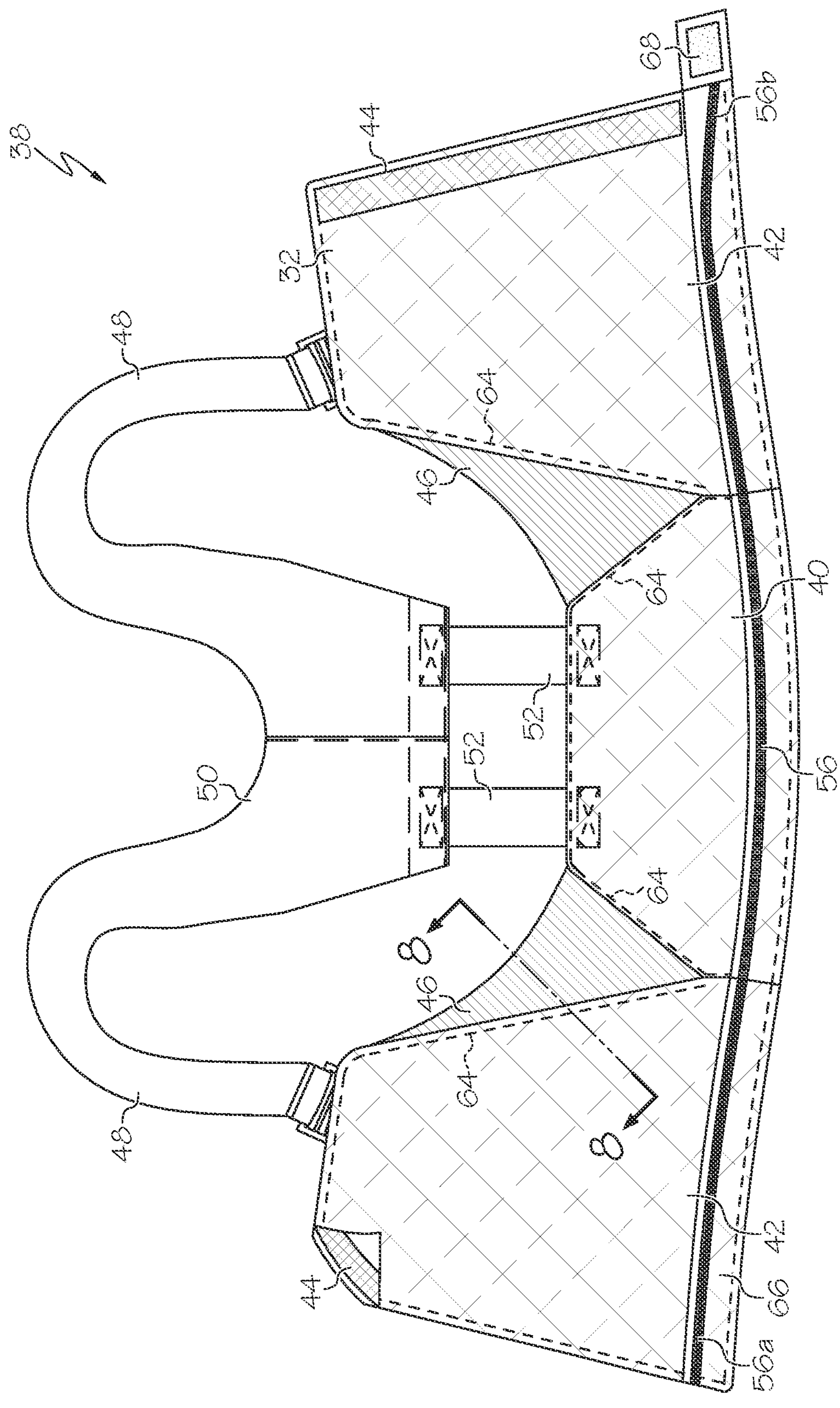
FIG. 7 is a front view of the bib of FIG. 4 laid flat in an open configuration.
Figure 8:
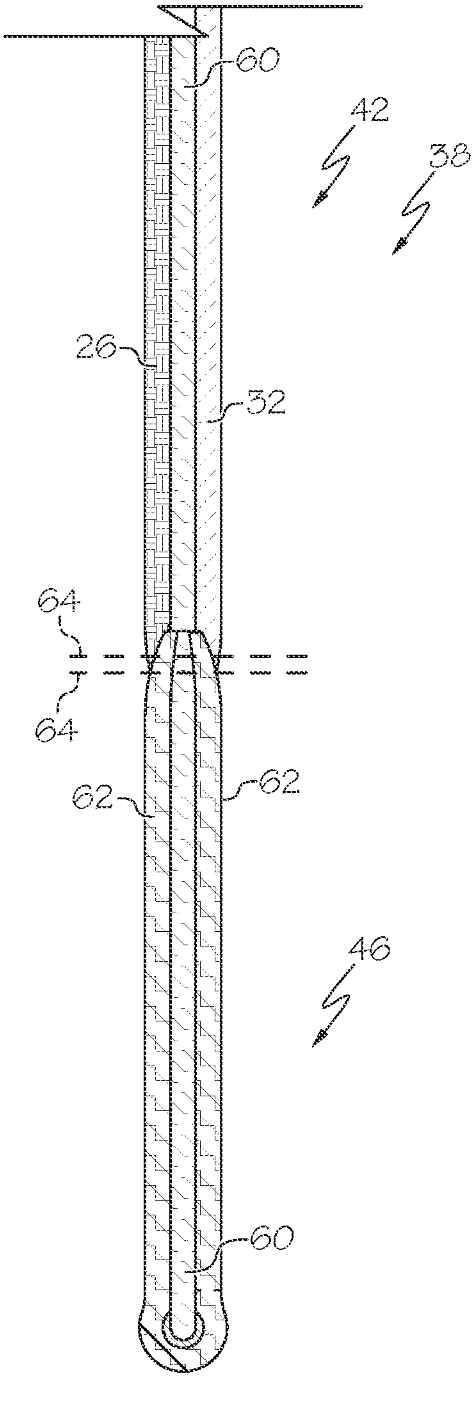
FIG. 8 is a side cross section taken along line 8-8 of FIG. 7.
Figure 9:
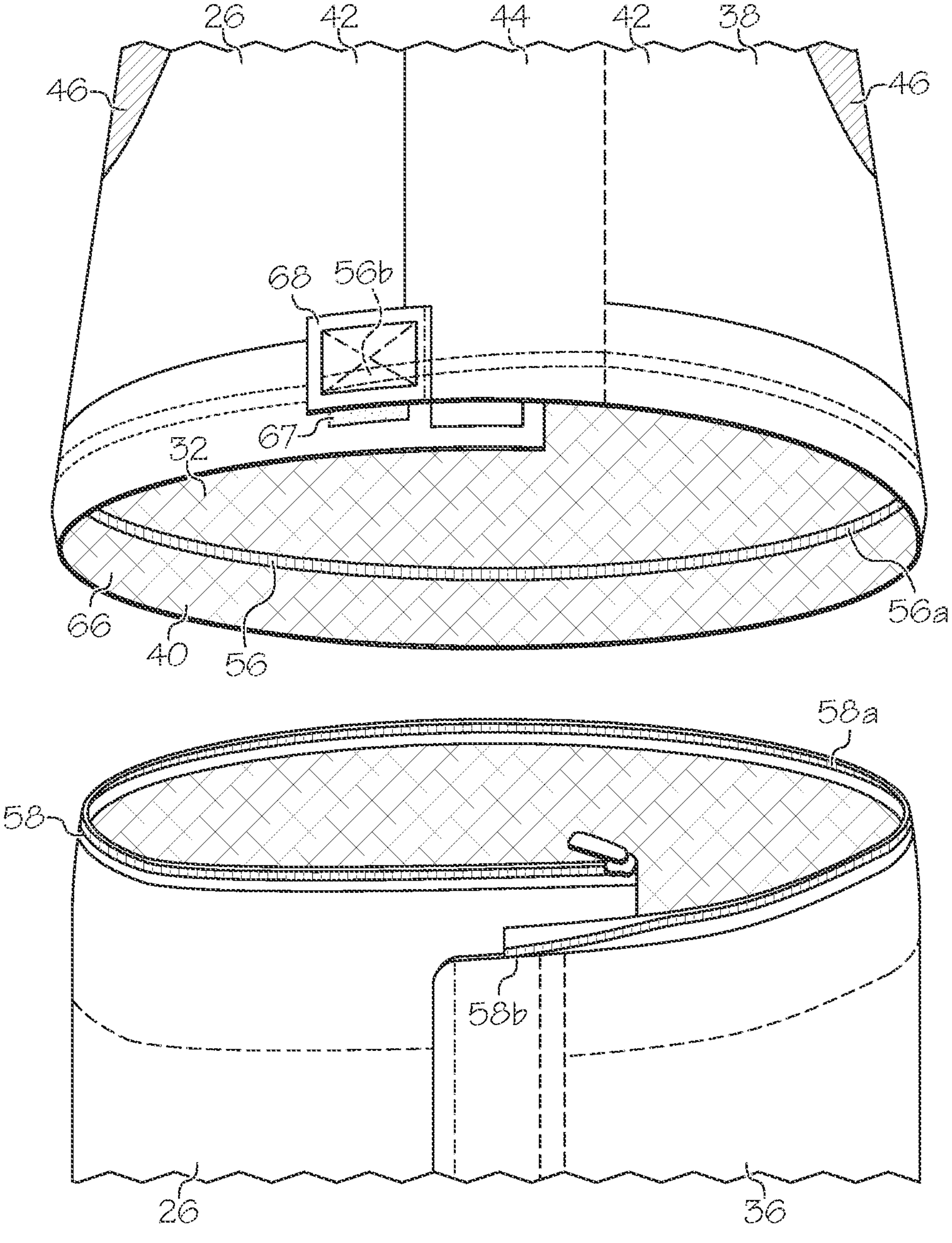
FIG. 9 is a front detailed perspective view of portions of the bib and trousers of FIG. 4, showing the fastener arrangement.

A bib 38 as shown in FIGS. 4-10 can be used alone or in conjunction with the coat 10 and/or trousers 36 described above. In one embodiment the bib 38 is configured to fit about the upper torso of a wearer, such as the chest, back and sides of a wearer in one case, covering a majority of a surface area thereof. With reference to FIG. 7 the bib 38 can include a back portion or panel 40 configured to be positioned on or adjacent to the back of a wearer when the bib 38 is worn. The bib 38 can also include two front portions or panels 42, each of which is configured to be positioned on or adjacent to a front or chest of a wearer when the bib 38 is worn. The bib 38 can include cooperating releasable fastener portions 44 or closure mechanism portions 44 (see also FIG. 4) positioned along the inner edge of each front portion 42, and the fastener portions 44 can be configured to releasably couple the front portions 42 together, as shown in FIGS. 4, 5 and 9.

In one case then the bib 38 generally takes the form of a vest-shaped component, and may lack any sleeves or arms directly coupled or attached thereto. This configuration can help to reduce bulk and provide a cost savings to the bib 38. In addition, the bib 38 can be useful to block particulates from reaching the torso and/or waist of a wearer, which blockage can be provided by the torso-only shaped bib 38, particularly when the bib 38 forms a good seal with the trousers 36, and it has been found that including sleeves/arms may not provide a strong incremental benefit in that regard. In some cases however sleeves or arms can be included as part of or attachable to the bib 38, such as attached to or in place of the shoulder straps 48.

The fastener or fastener portions 44 can take any of a wide variety of forms, including those described for the fastener 20 of the coat 10 outlined above. Moreover, if desired, the fastener 44 can be an air-tight, vapor-tight, particulate-resistant and/or moisture tight closure when closed. Thus, in one embodiment, the fastener 44 includes or take the form of a zipper with interlocking teeth and/or "press-to-close" strips (e.g. similar to those on ZIPLOC® plastic bags) or slide-to-close strips (similar to those in U.S. Pat. No. 6,014,795, which is incorporated herein by reference in its entirety). The fastener 44 may be a water tight zipper, such as those commercially available from YKK Corporation under the trademarks AQUASEAL® and AQUAGUARD® and/or described in YKK Corporation's U.S. Pat. Nos. 7,591,051, 7,500,291, and 7,337,506, each of which are incorporated herein by reference in their entirety. Such fasteners 44 can offer protection due to the use of film-coated tape and a zip element mechanism that seals the zipper completely. The fasteners 44 can also include or take the form of hook-and-loop material such as VELCRO® material.

The bib 38 can include a pair of stretch portions or panels 46, each of which is positioned between the back portion 40 and one of the front portions 42. Each of the stretch portions 46 is generally triangular in the illustrated embodiment when the bib 38 is laid flat as shown in FIG. 7, having a wider or base portion positioned along an upper edge thereof (positioned below a wearer's armpit when the bib 38 is worn) with an opposite vertex positioned at a lower portion.

Each stretch portion 46 (and each of its individual layers, as will be described in greater detail below) can be elastically stretchable such that, in one case, each stretch portion 46 can stretch and expand, in one case, at least about 5% of its length in one case, or at least about 10% of its length in another case, in the direction of applied stretching forces, and can generally return to its un-stretched position when the stretching forces are removed or no longer applied. In one case, each stretch portion 46 is generally directionally stretchable such that each stretch portion 46 is only, or primarily, stretchable in a single stretch direction, which in one case can be a generally horizontal direction when worn (e.g. parallel to a transverse or axial plane of a wearer). In this manner the stretch portions 46 can stretch and expand when the bib 38 is donned or doffed.

The bib 38 can also include a pair of shoulder straps 48, each of which is configured to fit over the shoulders of a wearer to ensure the bib 38 remains in place and can help to support a wearer's trousers 36 when the bib 38 is attached to the trousers 36, as will be described in greater detail below. Each shoulder strap 48 can be coupled to a yoke portion 50. The yoke portion 50 can be, in turn, coupled to the back portion 40 of the bib 38 by a pair of straps 52 which are, in one case, made of an elastic material.

With reference to FIGS. 5 and 6, the bib 38 may include a pair of attachment straps 54, wherein first end 54*a* (FIG. 6) of each attachment strap 54 is secured (permanently secured in one embodiment) to the back portion 40. Each attachment strap 54 is passed through a loop 55 on the front portion 42 (FIG. 5) such that the second end 54*b* of each strap is positioned adjacent to the first end 54*a*. The ends 54*a*, 54*b* of each strap 54, respectively, can be releasably attachable together; in one case for example a patch 57 of hook-and-loop fastening material such as VELCRO® is positioned at or near the end of each end 54*a*, 54*b*. In this manner each attachment strap 54, if utilized, can span at least part of a stretch portion 46 and be implemented to provide a secure fit with the wearer. In particular, after the bib 38 is donned, the second or free end 54*b* of each attachment strap 54 can be pulled tight, which can thereby cause the bib 38 to be pulled tight across the wearer's chest, and the attachment strap 54 can then be releasably coupled in place to provide the desired fit, removing slack in the bib 38.

In one case the bib 38 is configured to be releasably coupled to a pair of trousers 36 by a first or bib fastener portion 56 that extends around the lower circumferential edge or periphery of the bib 38. The bib fastener portion 56 is configured to releasably engage a trousers or second fastener portion 58 extending around the upper circumferential edge or periphery of the trousers 36 in a manner which will be described in detail below.

As shown in FIG. 8, the bib 38 can have three layers in the illustrated embodiment. In particular, in the front 42 or back 40 portions, the bib 38 can include an outer bib layer 26 which can be made of any of the same materials outlined above as the outer shell material 26 of the coat 10 or trousers 36 outlined above. The inner layer 32 of the bib 38 in the front 42 and back 40 portions can be an inner-most face cloth layer 32 which can include or be made of the materials outlined above for the face cloth 32 of the coat 10 or trousers 36 as described above.

The bib 38 can also include a middle or intermediate layer or material 60, or particulate-blocking material 60, positioned between the outer bib layer 26 and inner bib layer 32. The particulate-blocking material 60 can be configured to block particulates such as smoke particles, dust particles etc. In one case the particulate-blocking material 60 can have an average pore size less than about 10 microns in one case, or less than about 5 microns in another case, and lack any pores greater than about 100 microns in one case, or greater than about 50 microns in another case, or greater than about 20 microns in another case, or greater than about 10 microns in yet another case. The particulate-blocking layer 60 can have a barrier efficiency of greater than 95% for particles greater than 1 micron. In one case, the particulate-blocking material 60 is made of or can include flame-resistant, meta-aramid, microfiber filament, nonwoven material and more particularly, in one case can be or include NOMEX® NANO material sold by E.I. duPont de Nemours and Company of Wilmington Del., or in another case can be or include STEDAIR® PREVENT particulate barrier protection material sold by Stedfast USA of Piney Flats Tennessee, or be made of or include other materials.

The material of the particulate-blocking layer 60 can be relatively light, in one case having a basis weight of less than about 1 oz./square yard, or in one case about 0.6 oz./square yard. The material of the particulate-blocking layer 60 can also be relatively thin, in one case having a thickness of less than about 15 mils, or less than about 10 mils in one case. The material of the particulate-blocking layer 60 can have an air permeability of less than about 30 cfm. The material of the particulate-blocking layer 60 can also be relatively thermally protective, for example, having a thermal protection performance of at least about 30 in one case, or at least about 10 in another case, or less than about 30 in one case, or less than about 10 in one case, and can have a laundry durability of at least about 25 washes in one case. The bib 38 can provide some thermal protection, but in one embodiment is provided primarily for particulate blocking, and thus can in one case have a TPP less than about 10, or in another case less than about 5 to keep the bib 38 lightweight and flexible.

The particulate-blocking layer 60 of the bib 38 can help to protect the wearer from particulates that can penetrate through the coat 10 or otherwise be presented to the wearer, particularly at the interface/overlap of the coat 10 and trousers 36. In addition, the bib 38 is relatively lightweight due to the fact that the bib 38 may only include the particulate-blocking layer 60, along with the outer shell 26 and face cloth 32 which can be provided primarily for comfort and/or to protect the particulate-blocking layer 60. Since the bib 38 can lack a thermal barrier 30 (or at least lack the bulk material 30*a* of the thermal barrier 30) and/or a moisture barrier 28, the bib 38 can be relatively lightweight and flexible. In addition, since the bib 38 can be releasably, and not permanently, coupled to the trousers 36 as will be described in greater detail below, the bib 38 may not be required to include a thermal liner 30 and/or moisture barrier 28 (since that protection can be provided by other components), or otherwise comply with NFPA (or EN) regulations that apply to coats and/or trousers 36. Thus this configuration can help to more easily comply with regulations.

The particulate-blocking layer 60 of the bib 38 can be generally co-extensive with the outer shell 26/outer portions of the bib 38, including the back portion 40, front portions 42 and, if desired, the stretch portions 46. More particularly, with reference to FIG. 8, as can be seen, in the stretch portions 46 the particulate-blocking layer 60 can be positioned between two outer layers of elastic material 62. The two layers of elastic material 62 can in one case be made of a NOMEX® mesh aramid material, but can be nearly any elastic/stretch material, either aramid or non-aramid, woven or non-woven, etc. The two layers of elastic material 62 of the stretch portions 46 can be joined to the outer shell 26 and inner liner 32 of the back 40 and front 42 portions along seams 64. Thus in this case the stretch portions 46 have an outer layer, formed by the elastic material 62, that is different from an outer layer 26 of the remainder of the bib 38 (e.g. the back 40 and front 42 portions). In one case, the particulate-blocking layer 60 extends continuously/seamlessly throughout the bib 38, although if desired different pieces of the particulate-blocking material 60 can be positioned at different locations in the bib 38. The particulate-blocking material 60 and/or elastic material 62 of each stretch portion 46 can be generally stretchable/elastic in the same manner as the stretch portions as a whole 46 outlined above (e.g. elastically stretchable along at least about 5%, or at least about 10% of its length in one case, and/or be directionally elastic).

As noted above the bib 38 can include a bib fastener portion 56 extending around or adjacent to its lower periphery/perimeter that is releasably attachable to the trouser fastener portion 58 which extends around or adjacent to an upper periphery/perimeter of the pair of trousers 36 to couple the bib 38 to the trousers 36. The bib fastener portion 56 and trouser fastener portion 58 can be used to releasable couple the bib 38 and the trousers 36, but after the bib 38 and trousers 36 are coupled they may remain coupled during subsequent donning and/or doffing of the resultant garment assembly if desired. Thus, for example, the bib 38 and trousers 36 can be separated when it is desired to clean, repair, inspect or replace either the bib 38 or trousers 36.

Figure 10:
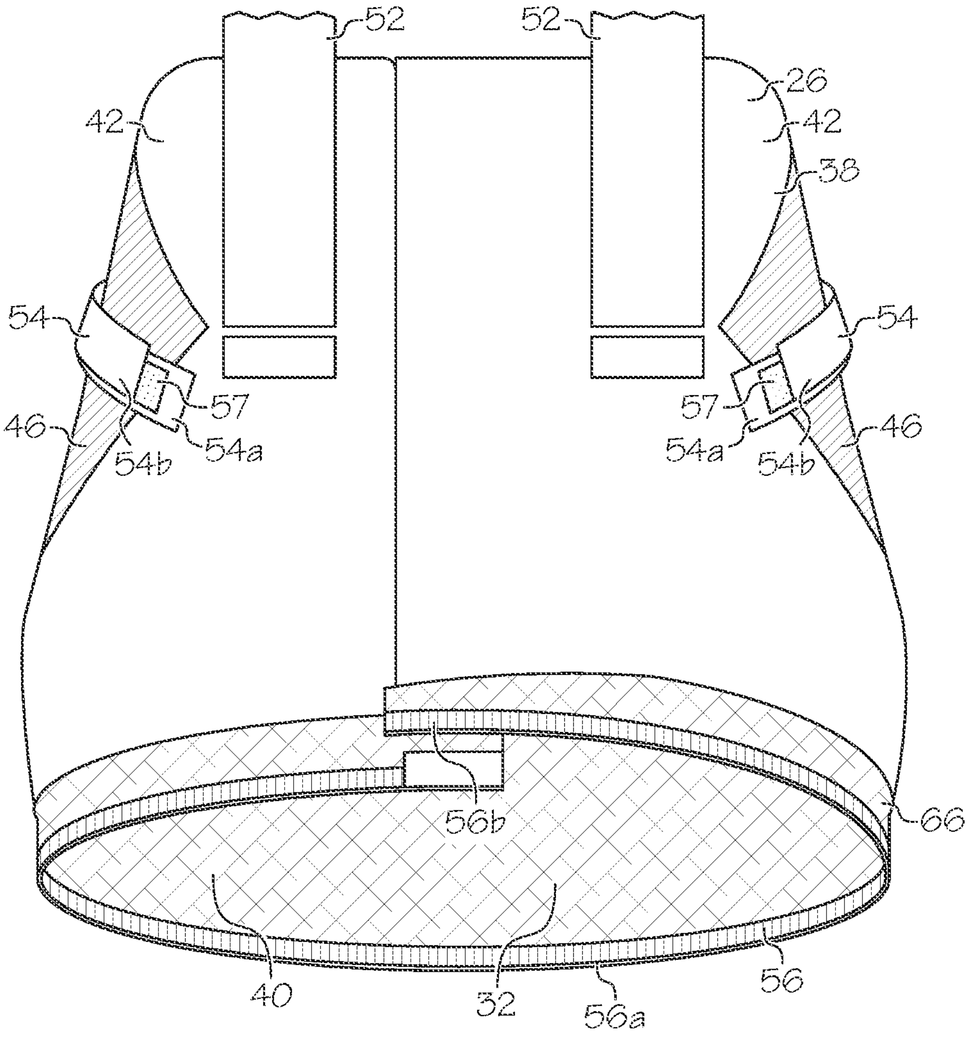
FIG. 10 is a back perspective view of the portion of the bib of FIG. 9, with the flap folded up.

In one case, both the bib 38 and the trousers 36 can have an outer perimeter in end view and each fastener portion 56, 58 has a base portion 56*a*, 58*a* that extends entirely about the perimeter (e.g. extends 360 degrees in one case; see FIGS. 4, 9 and 10). Each fastener portion 56, 58 can further have an extension portion 56*b*, 58*b* that extends greater than 360 degrees and thus overlaps with at least part of the base portion 56*a*, 58*a* in end view, or overlaps in the axial direction (or overlaps in the radial direction in end view).

Moreover, in some cases at least part of each extension portion 56*b*, 58*b* can be axially spaced apart from the base portion. More particularly, in one case, each of the fastener portions 56, 58 can extend at least partially in a helical or "spiral" pattern greater than 360 degrees. By having fastener portions 56, 58 that extend greater than 360 degrees, a more secure and fluid-tight/particulate-tight coupling between the bib 38 and trousers 36 is provided. In addition, the use of an offset in the axial direction due to the spiral configuration provides ease of connection and disconnection, and avoids the fasteners 56, 58 directly looping upon themselves. In one case each fastener portion 56, 58 extends a total of about 370 degrees, such that the extension portions 56*b*, 58*b* in this case extend 10 degrees.

In one case each fastener portion 56, 58 spirals in a generally continuous manner such that the axial advancement of each fastener portion 56, 58 is constant along its length (e.g. each fastener portion 56, 58 forms a general helical pattern). However, various other arrangements can be utilized; for example, in one case a majority of the base portions 56*a*, 58*a* are not offset axially, but only portions adjacent to (e.g. within about 10 degrees in one case, or within about 25 degrees in another case, or within about 4 inches in one case, or within about 16 inches in another case) or including the extension portions 56*b*, 58*b* are axially offset, and a constant spiral or helical shape is not provided. Further alternately a "spiral" shape can be provided but the "pitch" or axial advancement of the fastener portions 56, 58 varies at different positions along its length. FIGS. 4, 7 and 9 shown the extension portions 56*b*, 58*b* extending axially downwardly away from the associated base portions 56*a*, 58*a*; however the extension portions 56*b*, 58*b* can instead extend axially upwardly away from the associated base portions 56*a*, 58*a*.

With reference to FIGS. 4, 7 and 9, in one case the bib fastener portion 56 is spaced slightly axially away/upwardly from the lower edge of the bib 38, such that a flap 66 is positioned below the bib fastener portion 56. Accordingly, in order to secure the bib 38 to the trousers 36, the flap may need to be folded/turned up, as shown in FIG. 10 to expose the bib fastener portion 56 for coupling to the trouser fastener portion 58. After the fastener portions 56, 58 are secured, the flap 66 can be folded back down in position as shown in FIGS. 5 and 6. In the illustrated embodiment the trousers fastening portion 58 is located along the upper edge of the trousers 36, and thus the trousers 36 lack a flap corresponding to the flap 66 of the bib 38. However, if desired the bib fastener portion 56 can be positioned along the outer/lower edge of the bib 38 such that the bib 38 lacks a flap; conversely the trousers fastening portion 58 can be spaced away from the upper edge of the trousers 36 to provide a trousers flap (not shown) that is analogous to the flap 66 of the bib 38.

As shown in FIGS. 4, 5 and 9, an overlap tab 68 can be coupled to or included as part of the flap 66, wherein the overlap tab 68 includes a fastening material (such as hook-and-loop fastening material) positioned thereon. An extension portion 56*b* of the bib fastener portion 56 may be positioned on the overlap tab 68. The overlap tab 68 can be releasably attachable to an underlying portion of the bib 38/overlap flap 68, such as a patch 67 of hook-and-loop fastener material, to help to further cinch the lower portion of the bib 38 tight about the trousers 36 and form a sealed connection.

The fastener arrangement disclosed herein for securing the bib 38 to the trousers 36 can also be used at various other locations with various garment. For example, in one case the fastener arrangement having a spiral configuration and other features can be utilized to secure legs, calflets 41, sleeves 24, wristlets 70 or portions thereof etc. to coats 10 and trousers 36, respectively, or other garment or garment portions.

The coat 10 can, in one case, include a pair of wristlets 70 coupled thereto, as shown in FIG. 1. In one particular embodiment, each wristlet 70 is secured to an inner axial position of the sleeve 24, spaced axially inwardly away from an end of the sleeve 24, but the wristlet 70 protrudes axially outwardly from the end of the sleeve 24 to provide additional protection to the wrist and/or hand of a wearer. In one embodiment each wristlet includes an opening 72 such the wearer can pass his or her thumb or other finger through the opening 72 to aid in proper positioning and securement of the wristlet 70. However, the wristlets 70 need not necessarily include the opening 72. The trousers 36 can similarly include calflets 41 (FIG. 3) that are coupled to the bottom edge of the legs of the trousers 36 and provide the same or similar functionality as the wristlets 70.

The wristlets 70 and/or calflets 41 can be made of a variety of materials, including a knit, woven or fleece material, or a soft, non-woven material 74. The wristlet/calflet material 74 can be a flame resistant and/or thermally insulating material, including aramid material such as NOMEX or KEVLAR, a blend of aramid materials, a PBI material, a Lenzing P84 material, a modacrylic material, a rayon material, an oxidized polyacrylonitrile (OPF) material, a carbon fiber material, and/or a blend of aramid, PBI materials and other material, a blend of any of the materials listed above, and/or other materials that can be treated with an additive or additives to increase flame and/or thermal resistance. The wristlets 70/calflets 41 can be treated with a durable, water-repellant finish to substantially prevent the absorption or penetration of liquid moisture therethrough. In one case the wristlets 70/calflets 41 can be made of a material the same as or similar to that used for the wristlets of a firefighter garment as described in U.S. Pat. No. 6,038,700, the entire contents of which are hereby incorporated by reference.

The wristlets 70/wristlet material 74/calflets 41/calflet material may include elastic properties such that, for example in one case, the wristlets 70/calflets 41 can stretch at least about 10% in a plane or direction when stretching forces are applied and return to their pre-stretched shape when such stretching forces are removed. Such elastic properties may ensure that the wristlets 70/calflets 41 can stretch to accommodate a wearer's hands, gloves, legs and/or boots passing therethrough when donning and doffing the coat 10/trousers 36, but returns to (or tries to return to) its original shape to protect the wearer when worn. The elastic properties of the wristlets 70/calflets 41 may be accomplished in a variety of ways, including by making the wristlet 70/calflet 41 of a knit material of sufficient elasticity and/or incorporating elastic fibers into the material of the wristlet 70/calflet 41.

Figure 11:
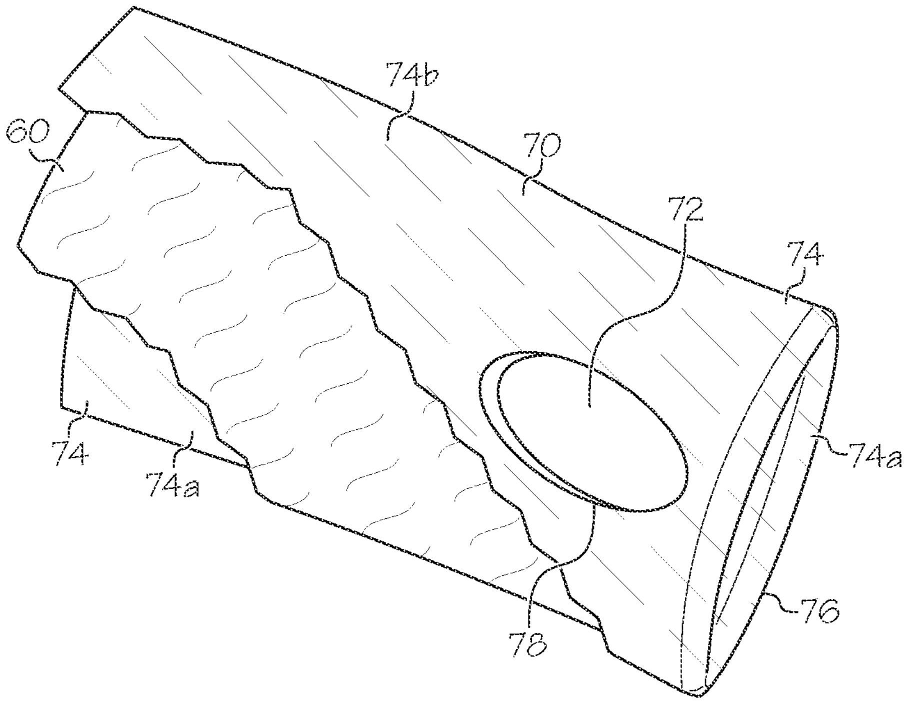
FIG. 11 is a front perspective view of a wristlet, with portions of various layers cut away for illustrative purposes.

As shown in FIG. 11, each wristlet 70 can be include or be made of a single, unitary continuous piece of wristlet material 74. The wristlet material 74 is folded about an outer fold line 76 at its distal end to form the material 74 in a two-ply arrangement with an inner layer 74*a* and an outer layer 74*b*. The material 74/wristlet 70 can thus form a generally tubular shape, and more specifically generally cylindrical shape at least while being worn, although the wristlet 70 may take on a somewhat collapsed shape when not being worn. The inner layer 74*a* and outer layer 74*b* can be coupled together by a seam line 78 extending around a perimeter of the opening 72 to maintain the alignment of the inner 74*a* and outer 74*b* layers, particularly about the opening 72.

A layer of particulate-blocking material 60 may be positioned between the inner 74*a* and outer 74*b* layers of the wristlet 70, and extending entirely about a circumference/perimeter thereof to form a closed loop/cylinder/tube. In this manner the particulate-blocking material 60 can provide the same or similar particulate blocking benefits to the wristlet 70 as those provided the bib 38 as outlined above.

The particulate-blocking material 60 can be relatively thin and light-weight, and may thus be difficult to handle. In particular the particulate-blocking material 60 may be susceptible to static electricity, air drafts in the manufacturing facility, etc. making it difficult to handle and position the particulate-blocking material 60 as desired for placement between the inner 74*a* and outer 74*b* layers.

Figure 12A:
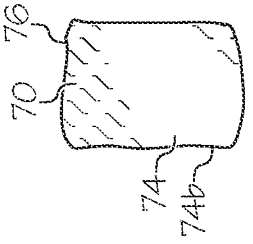
FIGS. 12A through 12M are a series of views showing a method for assembling a wristlet.

A method and system for assembling a wristlet 70 (lacking a thumb opening 72), carnet 41, or other garment or garment portion is shown in FIGS. 12A through 12M. In one case the wristlet material 74 is initially provided, as shown in FIG. 12A, in a generally tubular shape (e.g. a hollow shape of any cross section). Since the wristlet material 74 may not be rigid the wristlet 70 may actually be in the form of a collapsed tube. The inner layer 74*a* is folded inside the outer layer 74*b* about fold line 76, and thus the inner layer 74*a* is not visible in FIG. 12A.

Figure 12B:
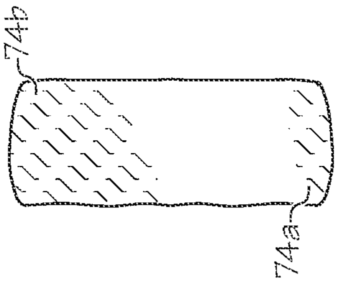
Figure 12C:
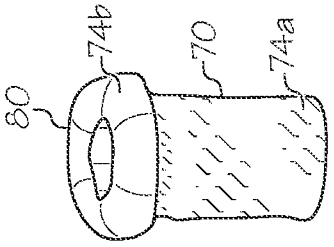
Figure 12D:
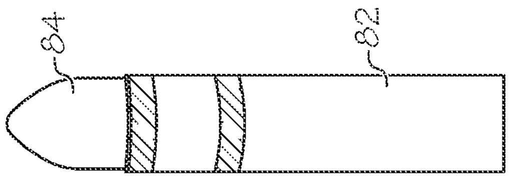

In FIG. 12B the wristlet material 74 is unfolded about fold line 76 such that both the inner layer 74*a* and outer layer 76*b* are visible and together form a single-ply generally tubular/cylindrical component. Next, as shown in FIG. 12C, the outer layer 74*b* is folded/rolled down upon itself to form a rolled, annular "donut-shaped" rolled portion 80. In an alternate embodiment, the step shown in FIG. 12B is skipped, and instead the outer layer 74*b* of FIG. 12A is folded/rolled up upon itself to formed the rolled portion 80 shown in FIG. 12C.

Figure 12E:
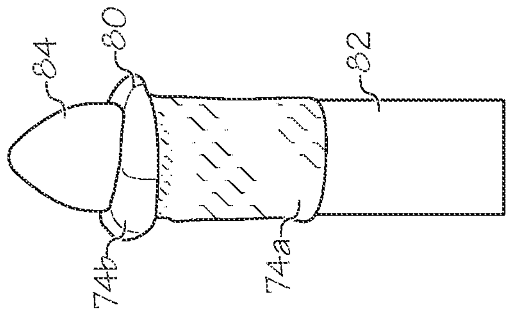

A fixture, component or mandrel 82 can then be provided (FIG. 12D), which is generally tubular in shape with a pointed tip 84 in one case but can have other shapes. The fixture 82 can be sized to be about the same size as, or slightly larger than, an inner surface/diameter of the wristlet 70/calflet 41 so that the wristlet material 74 is at least slightly stretched when placed on the fixture 82 to hold the wristlet 70 in place. Next, as shown in FIG. 12E, the wristlet 70 of FIG. 12C is placed on the fixture 82, with the pointed end 84 helping to guide the wristlet 70 into place on the fixture 82. If desired, all or part of the fixture 82 can be perforated or otherwise be air-permeable, and a suction force can be applied to the fixture 82 to help hold the wristlet material 74 and particulate-blocking material 60 in place during some or all of the following steps in which the wristlet material 74 is positioned on the fixture 82. However the fixture 82 need not necessarily be air permeable and/or be used with a suction force.

Figure 12F:
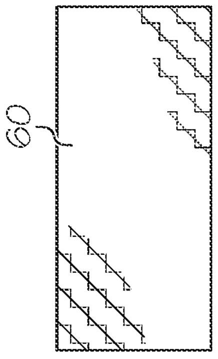
Figure 12I:
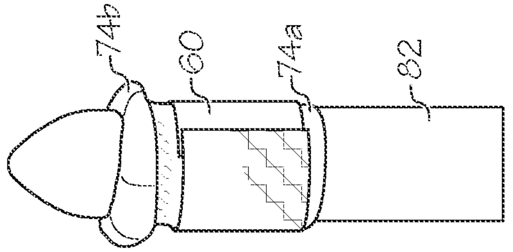
Figure 12K:
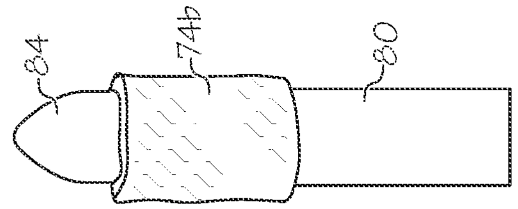
Figure 12H:
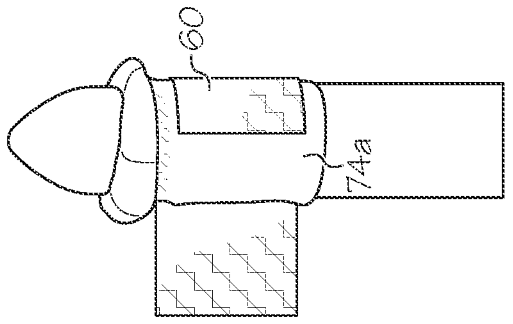
Figure 12J:
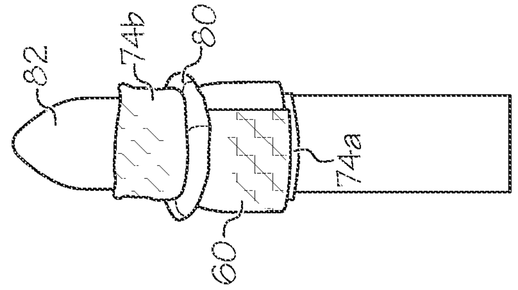
Figure 12G:
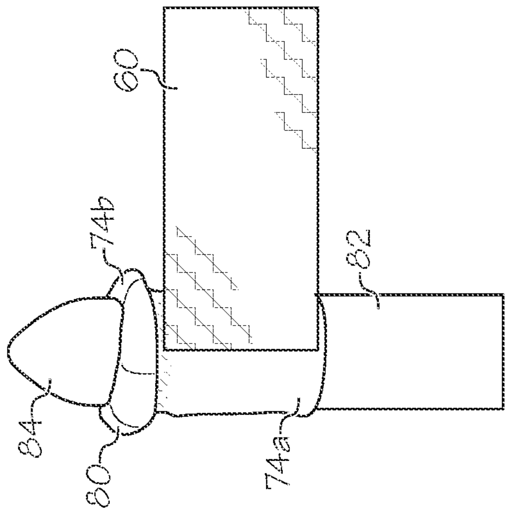

Once the wristlet material 74 is placed on the fixture 82, the particulate-blocking material 60, which can also have a generally rectangular shape (or other shapes) when laid flat, can be provided as shown in FIG. 12F. The particular-blocking material 60 is then placed on/adjacent to and radially outside the inner layer 74*a* (FIG. 12G), and entirely circumferentially wrapped about the inner layer 74*a* as shown in FIGS. 12H and 121, forming a closed loop, cylinder or tube. The outer layer 74*b*/annular portion 80 are then unfolded/unrolled in a downward direction (FIG. 12J) until the outer layer 74*b* is entirely unrolled (FIG. 12K). The wristlet 70 can then be removed from the fixture 80 (FIG. 12L) and used in conjunction with a garment.

Figure 12M:
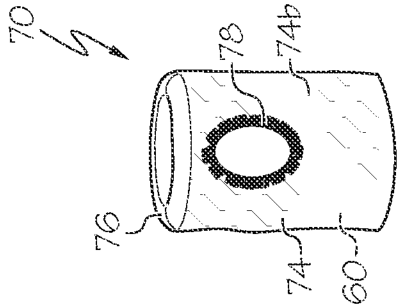
Figure 12L:
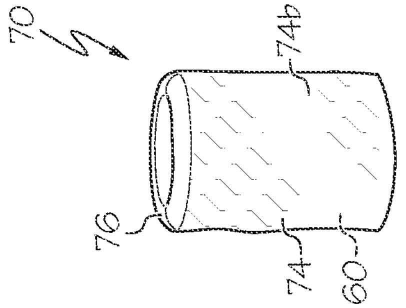

When the outer layer 74*b* is entirely unrolled the particulate-blocking material 60 is positioned radially between the inner layer 74*a* and outer layer 74*b*, and trapped/retained in position. The unrolling/unfolding nature of the outer layer 74*b* helps to trap the particulate-blocking material 60 in place by a smooth rolling or folding action which helps to keep the particulate-blocking material 60 in place and avoids wrinkling or shifting of the particulate-blocking material 60. The wristlet 70 can then be removed from the fixture 82 and further processed, such as being attached to the coat 10. If an opening 72 is desired in the wristlet 70, the desired opening can be formed in the three plies of material 74*a*, 74*b*, 60, and the edge 78 can be seamed or stitched, such as by a serge seam 78, as shown in FIG. 12M.

In this manner the wristlet material 74 forms a two-ply garment portion with the particulate-blocking material 60 positioned therebetween, for a total of three plies. The particulate-blocking material 60 can be entirely positioned between the plies 74*a*, 74*b* of the wristlet material 74 and trapped therebetween. This method and system provides a convenient and easily implemented manner to position the particulate-blocking material 60 inside the wristlet 70 or calflet 41.

Figure 13A:
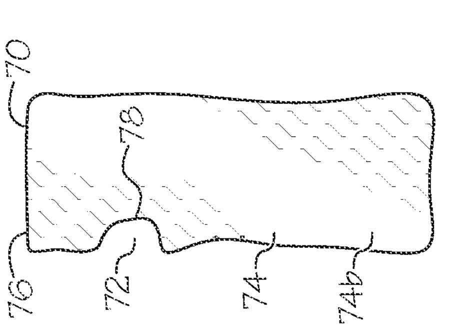
FIGS. 13A through 13M are a series of views showing a method for assembling a wristlet.

An alternate method and system for assembling a wristlet or other garment portion 70 having a thumb opening 72 is shown in FIGS. 13A through 13M. In one case the wristlet material 74 is provided, as shown in FIG. 13A, in a generally tubular shape. The inner layer 74*a* is folded inside the outer layer 74*b* about fold line 76, and thus is not visible in FIG. 13A.

Figure 13B:
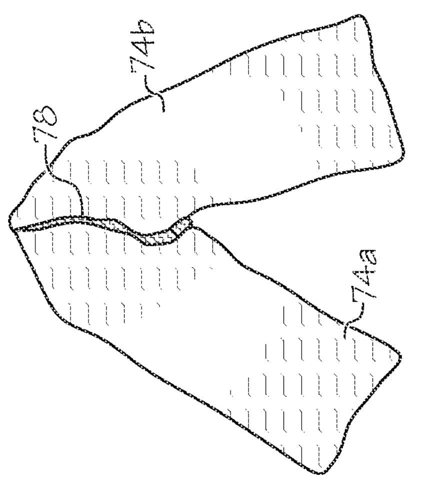

In FIG. 13B the wristlet material 74 is unfolded such that both the inner layer 74*a* and outer layer 76*b* are visible, such as that shown in FIG. 12B and described above. However, the layers 74*a*, 74*b* in the FIGS. 13A through 13M embodiment are coupled about seam line 78 extending about the opening 72, so the layers 74*a*, 74*b* are not necessarily formable into a cylindrical component in this configuration. Next, as shown in FIG. 13C, the outer layer 74*b* is folded/rolled upon itself to form a rolled, annular "donut-shaped" rolled portion 80.

Figure 13C:
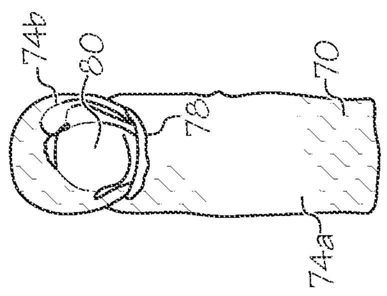
Figure 13D:
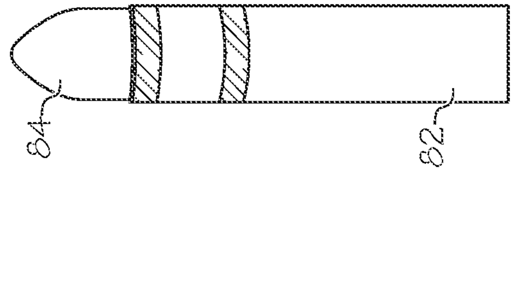
Figure 13E:
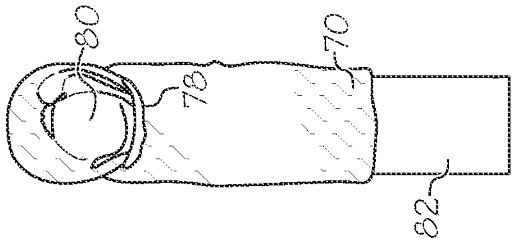
Figure 13F:
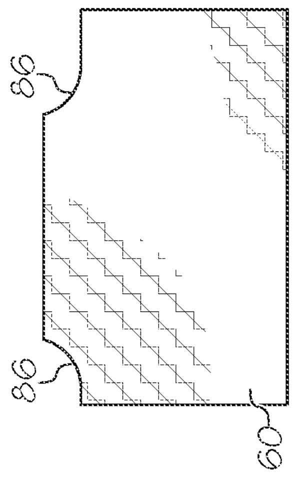

The fixture 82 can then be provided, as shown in FIG. 13D, and then the wristlet 70 of FIG. 13C is placed on the fixture 82 as shown in FIG. 13E. The particulate-blocking material 60, which can also have a generally rectangular shape (or other shapes) when laid flat, can be provided as shown in FIG. 13F. However in this embodiment the particulate-blocking material 60 includes a pair of cutouts or openings 86 at opposite corners thereof. The cutouts 86 are configured to align with the opening 72 after the particulate-blocking material 60 is positioned in the wristlet 70 to ensure the opening 72 remains unblocked. While the cutouts 86 are disclosed in FIG. 13F as being located on two corners of the particulate-blocking material 60, it should be understood that the cutouts 86 could instead take the form of a single cutout located at one corner and/or along an outer edge of the particulate-blocking material 60, or could also take the form of an internally positioned cutout 86.

Figure 13G:
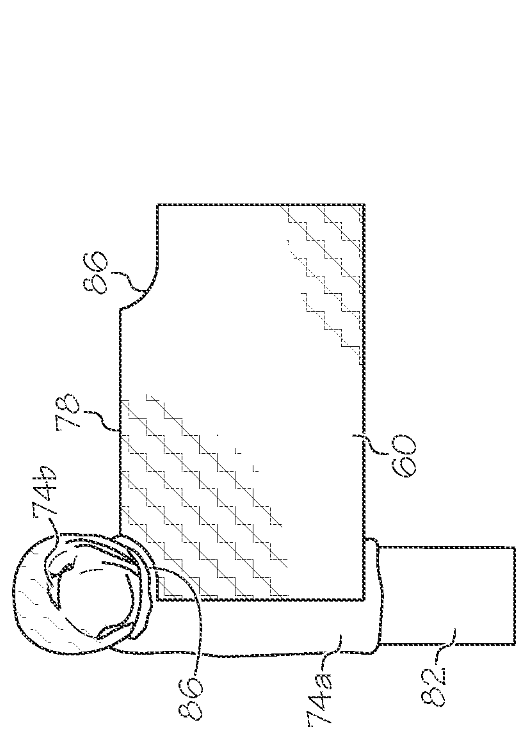
Figure 13H:
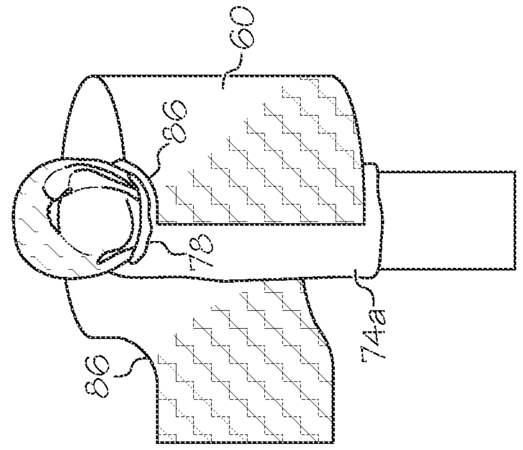
Figure 13I:
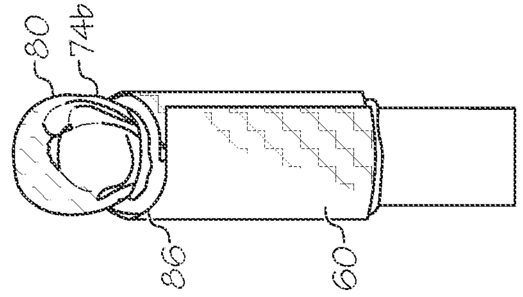
Figure 13J:
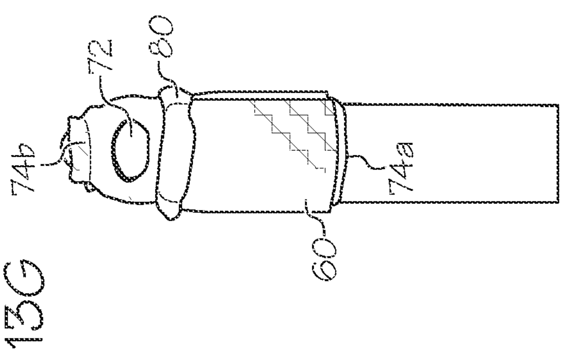
Figure 13K:
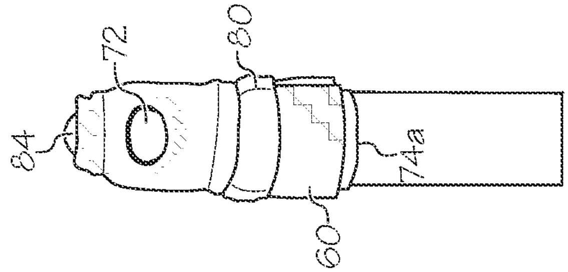
Figure 13L:
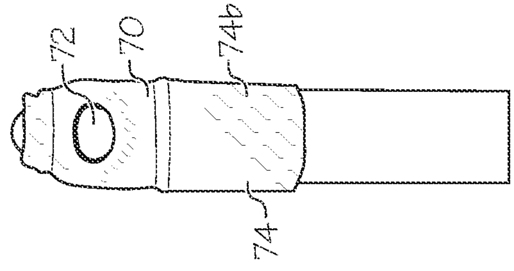
Figure 13M:
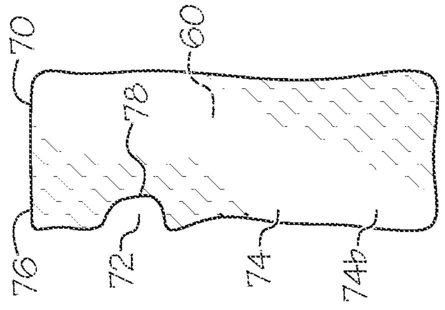

In any case, once the particular-blocking material 60 is provided, it is then placed on/adjacent to and radially outside the inner layer 74*a*, and entirely circumferentially wrapped about the inner layer 74*a* as shown in FIGS. 13G, 13H and 131 with the cutouts 86 positioned adjacent the seam 78 to align with the opening 72. The outer layer 74*b*/annular portion 80 are then unrolled in a downward direction until the outer layer 74*b* is entirely unrolled. When the outer layer 74*b* is unrolled the particulate-blocking material 60 is positioned radially between the inner layer 74*a* and outer layer 74*b*, and trapped/retained in position. In addition, the cutouts 86 are aligned with each other and with the opening 72 to ensure access therethrough. The wristlet 70 can then be removed from the fixture 82 and further processed, such as being attached to the coat 10 (or attached to the trousers 36 in the case of a calflet 41).

Having described the invention in detail and by reference to the preferred embodiments, it will be apparent that modifications and variations thereof are possible without departing from the scope of the invention.

What is claimed is:

1. A protective garment system comprising:

a bib configured to fit around at least part of an upper portion of a torso of a wearer, wherein said bib includes an outer material and an air-permeable particulate-blocking material which is configured to be positioned between said outer material and the wearer when said bib is worn, wherein said bib has a perimeter, wherein the particulate-blocking material is configured to block particulates and has a plurality of pores formed therein to provide air permeability, having an average pore size of less than about 10 microns, and wherein the particulate-blocking material is made of flame-resistant meta-aramid material or includes flame-resistant meta-aramid material.

2. The protective garment system of claim 1 wherein the particulate-blocking material is generally coextensive with the outer material and wherein said bib further includes an inner face cloth layer, and wherein said particulate-blocking material is generally positioned between said outer material and said inner face cloth layer.

3. The protective garment system of claim 1 wherein said bib lacks a moisture barrier, where such moisture barrier is configured to permit moisture vapor to pass therethrough and configured to block liquids from passing therethrough.

4. The protective garment system of claim 1 wherein said bib has a thermal protection performance of less than about ten.

5. The protective garment system of claim 1 wherein said bib includes releasable fastener extending about or positioned adjacent to a lower edge of said bib and extending continuously at least about 360 degrees about the entire perimeter of the bib.

6. The protective garment system of claim 1 wherein said bib is sleeveless.

7. The protective garment system of claim 1 wherein the bib includes a back portion configured to be positioned adjacent to a back of the wearer when worn and two front portions each of which is configured to be positioned adjacent to a front of the wearer when said bib is worn, and wherein the front portions are releasably attachable to each other.

8. The protective garment system of claim 7 wherein the bib includes a pair of stretch portions, each of which is generally positioned between said back portion and one of said front portions, wherein each stretch portion includes the particulate blocking material.

9. The protective garment system of claim 8 wherein the particulate-blocking material of the stretch portions are elastic, and wherein the bib further comprises a pair of attachment straps, wherein each attachment strap is releasably attachable to said bib in a position where the attachment strap spans one of said stretch portions, and wherein said bib further includes a pair of shoulder straps, each of which is configured to fit over a shoulder of the wearer when said bib is worn.

10. The protective garment system of claim 1 wherein the particulate-blocking material has a thickness of less than about 15 mils.

11. The protective garment of claim 1 wherein the particulate-blocking material has an air permeability of less than about 30 cfm.

12. The protective garment of claim 1 wherein the particulate-blocking material has a basis weight of less than about 1 oz/square yard.

13. The protective garment of claim 1 wherein the particulate-blocking material lacks any pores having a size greater than 100 microns, and has a barrier efficiency of greater than 95% for particles greater than 1 micron.

14. The protective garment system of claim 1 wherein the bib is configured to be releasably attached to a pair of trousers about at least part of the perimeter.

15. The protective garment system of claim 14 further comprising said pair of trousers, and wherein said bib is releasably and continuously coupled to said pair of trousers 360 degrees about an entire perimeter of the trousers.

16. The protective garment system of claim 15 further comprising a firefighter protective coat which is wearable separable from said bib, and wherein said bib is generally positioned between said coat and the wearer.

17. A protective garment system comprising:

a bib configured to fit around at least part of an upper portion of a torso of a wearer, wherein said bib includes an outer material and an air-permeable particulate-blocking material which is configured to be positioned between said outer material and the wearer when said bib is worn, wherein the particulate-blocking material is made of a microfiber filament material or includes a microfiber filament material.

18. A protective garment comprising:

a bib configured to fit around at least part of an upper portion of a torso of a wearer, wherein said bib includes an outer material and an air-permeable particulate-blocking material which is configured to be positioned between the outer material and the wearer when the bib is worn and wherein the bib is sleeveless, has a thermal protection performance less than about 10, and lacks a moisture barrier that is configured to permit moisture vapor to pass therethrough but block liquids from passing therethrough.

19. The protective garment of claim 18 wherein the particulate-blocking material is configured to block particulates, has a plurality of pores to provide the air permeability, and has an air permeability of less than about 30 cfm.

20. The protective garment of claim 18 wherein said bib includes releasable fastener extending about or positioned adjacent to a lower edge of said bib and extending continuously at least about 360 degrees about an entire perimeter of the bib.

21. A protective garment comprising:

a bib configured to fit around at least part of an upper portion of a torso of a wearer, wherein said bib includes an outer material, an inner material and a particulate-blocking material which is not a moisture barrier and is configured to be positioned between said outer material and said inner material when said bib is worn, wherein the particulate-blocking material is configured to block particulates, has a thickness of less than about 15 mils, and has an air permeability of less than about 30 cfm.

22. The garment of claim 21 wherein said bib has a perimeter at or adjacent to a lower edge thereof and is configured to be continuously coupled to a pair of trousers 360 degrees about an entire perimeter of the trousers, wherein said bib is sleeveless, wherein said bib has a thermal protection performance less than about 10, and wherein said bib lacks a moisture barrier that is configured to permit moisture vapor to pass therethrough and configured to block liquids from passing therethrough, and has an average pore size of less than about 100 microns.

23. The garment of claim 21, wherein the particulate-blocking material has a plurality of pores formed therein to provide the air permeability, having an average pore size of less than about 10 microns.

24. The garment of claim 21 wherein the particulate-blocking material is made of flame-resistant meta-aramid material or includes flame-resistant meta-aramid material, or wherein the particulate-blocking material is made of a microfiber filament material or includes a microfiber filament material.

* * * * *